May 18, 1926.
C. H. TAYLOR ET AL
1,585,438
DIFFERENTIAL
Filed August 21, 1924
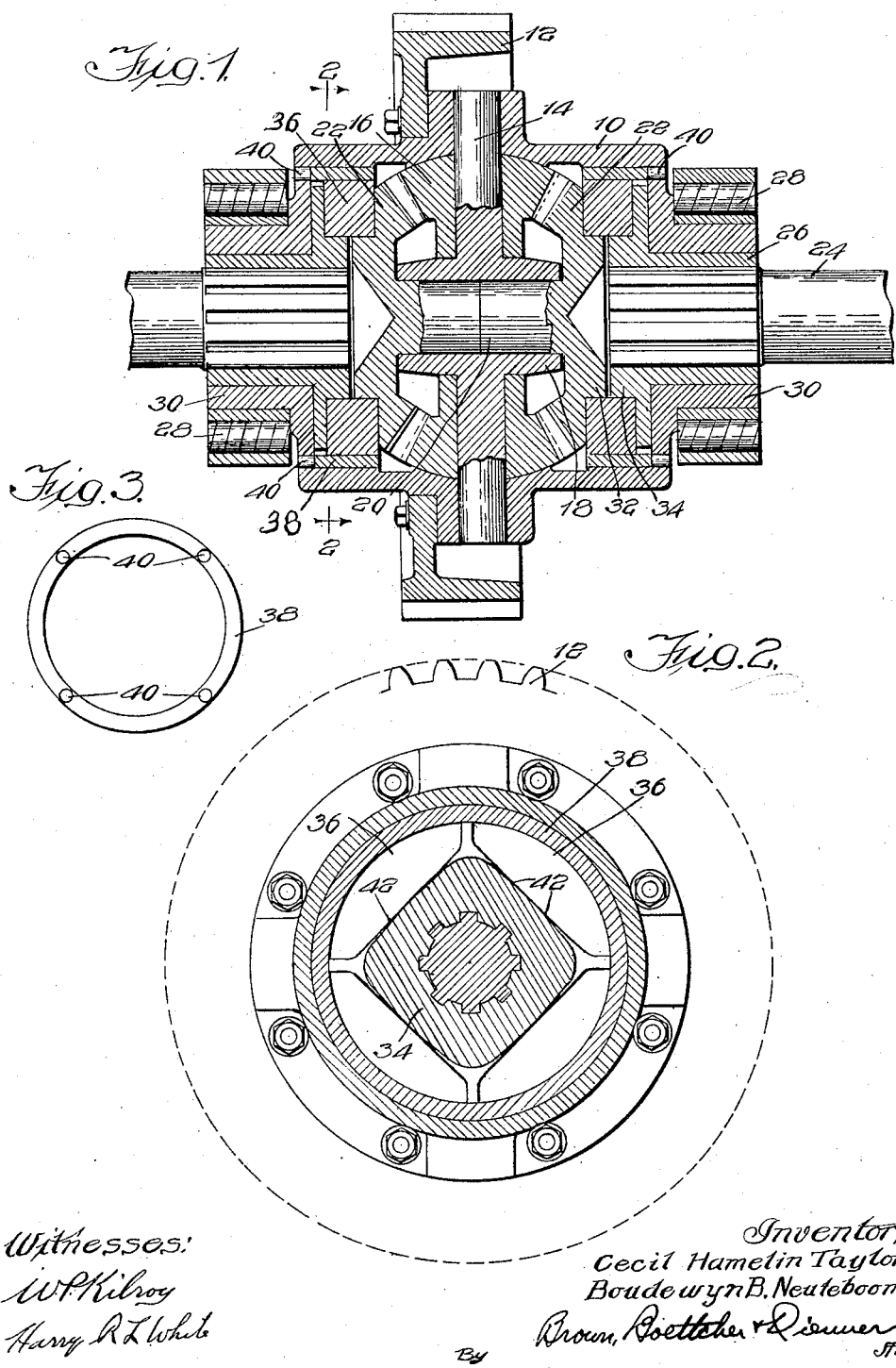
Witnesses:
W. P. Kilroy
Harry R L White
Inventors
Cecil Hamelin Taylor
Boudewyn B. Neuteboom
By Brown, Boettcher & Dienner
Attys Patented May 18, 1926.

1,585,438

UNITED STATES PATENT OFFICE.

CECIL HAMELIN TAYLOR AND BOUDEWYN B. NEUTEBOOM, OF DETROIT, MICHIGAN.

DIFFERENTIAL.

Application filed August 21, 1924. Serial No. 733,313.

Our invention relates to differential gearing of the type which, while permitting a relative difference in the velocity of rolling of the wheels, shall apply a driving power even when one wheel is comparatively free to turn.

A particular advantage of the structural embodiment herein set forth is its freedom from any limitation as to radial dimensions of the unit. Where the friction employed to retard the relative movement of the parts is carried by a radial surface, the limitations of the materials as to the load per square inch that can safely be imposed on the friction surfaces limits the load that can be properly handled without either a multiple disc type of construction or large radial dimensions, both of which are open to many serious objections. Where the operating friction surfaces are surfaces of revolution about the axis of the live axles, the load can be doubled by doubling the axial dimensions of the friction surfaces without introducing any additional parts or any change in radial dimensions, and only a relatively small increase in the axial dimensions of the entire unit, which, moreover, is largely immaterial in any event.

Further objects and advantages of the invention will become apparent as the description proceeds.

In the accompanying drawings:

Fig. 1 is a section through the axis of the axle;

Fig. 2 is a section on the line 2—2 of Fig. 1; and

Fig. 3 is a detail face view of one of the friction rings.

In the embodiment of the invention selected for illustration, power is delivered to the casing 10 by any suitable means such as ring gear 12. The casing 10 carries the usual spider with radial arms 14 on which the balancing pinions 16 are mounted, said arms radiating from a sleeve 18, which sleeve rotatably receives the journals 20 of the driven gears 22. Live axles 24 are connected to sleeve 26 by a multiple spline connection, the whole assembly being held in alignment by rolling bearings 28 engaging bosses 30 on casing 10. To transfer torque from gears 22 to sleeves 26, a squared boss 32 on each gear registers with a similar squared boss 34 on the adjacent sleeve. These bosses lie within a plurality of segments 36 abutting the peripheral faces of both bosses.

For durability in service and convenience in replacing the friction parts, we prefer to have segments 36 bear radially against a removable friction ring 38 fitting snugly against a suitable interior surface on the casing 10 and held against rotation by a plurality of pins 40 projecting through small holes in the casing.

Referring now more particularly to Fig. 2, it will be evident that the peripheral face of boss 34 bears against segments 36 over a material area out to points indicated at 42. The angle between the direction of the contacting surfaces, and a radial line drawn to the point 42, determines the relation between radial movement of segments 36 and relative rotation of boss 34. As this angle is fairly large, a material amount of wear on the friction surfaces of segments 36 and ring 38 can occur without introducing enough backlash into the transmission to be at all objectionable. It will also be noted that the axial dimensions of segments 36 are only a small fraction of the axial dimensions of the entire differential, so that the friction surface available could be doubled by doubling the axial dimensions of segments 36, with only a relatively insignificant increase in the axial dimensions of the complete device.

Without further elaboration, the foregoing will so fully explain the gist of our invention that others may, by applying current knowledge, readily adapt the same for use under various conditions of service. It will, for instance, be obvious that the angle subtended by points 42 may be varied to determine the extent of the locking action. Thus with a two inch radius to brake lining 38, a one inch radius to points 42, and a coefficient of friction of 0.05 the angle between points 42 on the same face of the boss should be 24 degrees to secure a full locking differential. This and many other variations in design may be made without eliminating certain features which may properly be said to constitute the essential items of novelty involved, which items are intended to be defined and secured to us by the following claims.

We claim:

1. In a differential, in combination, a frame, a gear nest including driving balancing pinions and driven gears, and connections for transmitting torque from each driven gear to its live axle, said connections including torque-sensitive means for producing friction between the frame and the live axle without axial thrust.

2. In a differential, in combination, a frame, a bevel gear nest including driving balancing pinions and driven gears, and connections for transmitting torque from each driven gear to its live axle, said connections including torque-sensitive means for producing friction between the frame and the live axle without axial thrust.

3. In a differential, in combination, a frame, a gear nest in said frame including balancing pinions and driven gears, a live axle for each driven gear, and a torque sensitive lost motion connection between each driven gear and its live axle for producing friction between the frame and the live axle, said lost motion being rotary, whereby no axial force on the driven gear is produced thereby.

4. In a transmission, in combination, a differential frame, live axles, load balancing mechanism, gears co-axial with and connected to said live axles driven by said balancing mechanism, and torque sensitive means independent of said balancing mechanism for frictionally opposing relative movement between said frame and the live axles.

5. In a transmission, in combination, a differential frame, balancing pinions carried by said frame, driven gears actuated by said pinions, live axles, one for each gear, and brake shoes for transmitting power from each gear to its live axle, said shoes being arranged to move radially into frictional engagement with said frame under the load transmitted through them.

6. In a transmission, in combination, a differential frame, balancing pinions carried by said frame, driven gears actuated by said pinions, live axles, one for each gear, and brake shoes for transmitting power from each gear to its live axle, said shoes being arranged to move into frictional engagement with said frame under the load transmitted through them.

7. In a transmission, in combination, a differential frame, balancing pinions carried by said frame, driven gears actuated by said pinions, live axles, one for each gear, each gear and its axle having opposed polygonal ends, said frame having a drum portion encircling said ends, and segmental brake shoes engaging said ends to transmit power and urged outwardly by the forces transmitted into braking engagement with said drum.

8. In a transmission, in combination, a differential frame, balancing pinions carried by said frame, driven gears actuated by said pinions, live axles, one for each gear, each gear and its axle having opposed polygonal ends, said frame having a drum portion encircling said ends, and segmental brake shoes engaging said ends to transmit power and urged outwardly by the forces transmitted into braking engagement with said drum, the ratio of radial movement of said shoes to peripheral movement of the faces engaging them being less than the sine of thirty degress.

9. In combination, a frame, gearing associated therewith comprising a pinion and a gear driven by the said pinion, a driven element associated with the said gear, and a connection, including radially wedging torque sensitive means adapted to be moved in a plurality of directions contemporaneously to produce friction between the frame and the driven element without axial thrust, for transmitting torque from the gear to the driven element.

10. In combination, a frame, a driven element associated therewith, a driven member, a frictional element driven by the said driven element, and radially wedging torque sensitive means arranged to be moved in a plurality of directions contemporaneously into frictional engagement with the said frame under the load transmitted through it for transmitting power from the frictional element to the driven member.

In witness whereof, we hereunto subscribe our names this 16th day of August, 1924.

CECIL HAMELIN TAYLOR.
BOUDEWYN B. NEUTEBOOM.